Patented Feb. 20, 1934

1,948,162

UNITED STATES PATENT OFFICE 1,948,162

PROCESS OF PREPARING COMPOUNDS OF THE 1 - PHENYL - 2 - AMINOALCOHOLS - 1 SERIES HYDROXYLATED IN THE PHENYL NUCLEUS

Max Bockmühl, Gustav Ehrhart, and Leonhard Stein, Frankfort-on-the-Main, Germany, assignors to Winthrop Chemical Company, Inc., New York, N. Y., a corporation of New York No Drawing. Application May 11, 1931, Serial No. 536,660, and in Germany May 31, 1930

9 Claims. (Cl. 260—128.5)

The present invention relates to a process of preparing compounds of the 1-phenyl-2-aminoalcohols-1-series hydroxylated in the phenyl nucleus.

We have found that compounds of the 1-phenyl-2-aminoalcohols-1 series hydroxylated in the phenyl nucleus of the following general formula

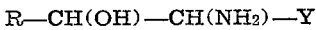

wherein R stands for a phenyl nucleus substituted by at least one hydroxy group and Y for an alkyl group, are obtainable by causing nitrous acid to act upon a compound of the following general formula

wherein R stands for a phenyl nucleus substituted by at least one radical of the group comprising alkoxy, aralkoxy and acyloxy, and Y for an alkyl group, and subjecting the isonitroso compound thus obtained to a reduction process.

The introduction of the nitroso group is preferably carried out in the presence of a diluent, for instance, by dissolving the aliphatic-aromatic ketone, in which the hydroxy groups of the phenyl nucleus are esterified or etherified, in an organic solvent, as for instance ether or benzene.

The nitrous acid is preferably produced in the reaction mixture, for instance by causing a mineral acid, preferably gaseous hydrochloric acid, to act upon a salt or another derivative of nitrous acid, such as for instance sodium nitrite or butyl or propyl nitrite.

The isonitroso compounds are preferably reduced by a catalytic process to which the compounds may be subjected in the form of their salts or as free bases, preferably dissolved in an organic solvent, such as for instance alcohol. As catalysts may be used precious metal catalysts or other hydrogenation metal catalysts, for instance those of the iron group. When using a precious metal catalyst, for instance, a palladium catalyst, the isonitroso group is reduced by the hydrogenation to the amino-group and the keto-group is reduced to the —CHOH— group and when the hydroxy groups of the phenyl nucleus are substituted by aralkyl radicals these are simultaneously split off. When using as a catalyst a metal of the iron group, for instance a nickel catalyst, the hydrogenation only causes reduction of the isonitroso and the keto group and when the parent compounds are substituted by aralkyl oxy groups in the phenyl nucleus, the reduction products are further treated in order to split off the said aralkyl radicals from the oxygen atom attached to the phenyl nucleus, for instance, by subjecting them to a further catalytic hydrogenation in the presence of a precious metal catalyst. When the compounds are substituted by acyl radicals in the hydroxy groups of the phenyl nucleus, the acyl radical or radicals may be split off after the introduction of the isonitroso group at any stage of the process, for instance before the reduction of the isonitroso compound, by heating with a mineral acid, for instance hydrochloric acid.

The 1-phenyl-2-aminoalcohols-1 hydroxylated in the phenyl nucleus as obtained according to this process are valuable therapeutics and can be utilized as remedies for treating diseases of the circulation of blood.

The following examples serve to illustrate the invention, but they are not intended to limit it thereto.

1. 45 grams of ortho-hydroxypropiophenone are introduced into a solution of 6.9 grams of sodium in 230 cc. of alcohol and the whole is boiled for 1 hour together with 54 grams of benzyl bromide in a reflux apparatus. After the sodium bromide formed has been removed by filtering, the alcoholic solution is evaporated on the water bath and the residue is dissolved in ether. The whole is then shaken with water, the ethereal solution is dried by means of sodium sulfate and evaporated. The ortho-benzyloxy-propiophenone distils in 158° C. under 1 mm. pressure.

20 grams of ortho-benzyloxy-propiophenone are dissolved in 8 times the quantity of ether and in the course of 20 minutes 9 grams of butyl nitrite are added drop by drop, while introducing hydrochloric acid gas. After the whole has been allowed to stand over night, the ethereal solution is concentrated and the residue is taken up in caustic soda solution. On addition of dilute hydrochloric acid the ortho-benzyloxy-isonitroso-propiophenone separates from the alkaline solution and after recrystallization from xylene melts at 89° C.

7.5 grams of ortho-benzyloxy-isonitrosopropiophenone are dissolved in alcoholic hydrochloric acid and hydrogenated by treatment with hydrogen in the presence of palladium. After the calculated quantity has been taken up, the catalyst is separated by filtering by suction and the filtrate is evaporated in a vacuum. After recrystallizing the residue from butyl alcohol, there is obtained the ortho-hydroxyphenylpropanol-amine-hydrochloride decomposing at 217° C.

2. 240 grams of meta-benzyloxy-propiophenone are dissolved in 1.2 liters of ether and 110 grams of butyl nitrite are added drop by drop, at boiling temperature, while introducing hydrochloric acid gas. The benzyloxy-isonitrosopropiophenone, which is isolated as indicated in Example 1, melts at 128° C. The yield amounts to 80%.

100 grams of meta-benzyloxy-isonitrosopropiophenone are dissolved in 200 cc. of alcohol and hydrogenated at 50° C. with hydrogen in the presence of a nickel catalyst until hydrogen is no longer absorbed. The alcohol is distilled off in a vacuum and the residue is mixed with dry ether, whereby the meta-benzyloxy-phenylpropanolamine separates in a solid form. It melts at 125° C.

50 grams of meta-benzyloxy-phenylpropanolamine are dissolved in 150 cc. of alcohol and hydrogenated at 40° C.–50° C. with hydrogen in the presence of palladium under a slightly raised pressure. The absorption of hydrogen is soon complete. The catalyst is then removed by filtering by suction, the alcohol is distilled off and the residue is mixed with alcoholic hydrochloric acid. After a short time the meta-hydroxyphenyl-propanolamine-hydrochloride crystallizes. It melts at 180° C. The yield amounts to 75%. The meta-benzyloxy-propiophenone used as starting material is prepared according to the process of our co-pending U. S. application Ser. No. 505,460, filed December 29, 1930.

3. 240 grams of para-benzyloxy-propiophenone are dissolved in 2.4 liters of ether and in the course of ½ hour the solution is mixed with 108 grams of butyl nitrite while introducing hydrochloric acid gas. After standing for several hours, the liquid is evaporated and the residue is stirred with petroleum ether. The para-benzyloxy-isonitrosopropiophenone which crystallizes is filtered by suction, well washed with petroleum ether and recrystallized from benzene. It melts at 135° C.

For the preparation of the para-hydroxyphenylpropanolamine-hydrochloride, the isonitroso compound produced is dissolved in alcohol and first reduced with hydrogen in the presence of a nickel catalyst. The liquid is completely removed by evaporation, the residue is dissolved in ether and the para-benzyloxy-phenylpropanolamine-hydrochloride is precipitated from the solution by introducing dry hydrochloric acid gas. The product is dissolved in alcohol and hydrogenated by treatment with hydrogen in the presence of palladium. When absorption of hydrogen is completed, there is obtained from the alcoholic solution by evaporation the crystallized para-hydroxyphenylpropanolamine-hydrochloride which, after recrystallization from alcohol and ether, decomposes at 207° C.

The para-benzyloxy-propiophenone used as parent material is obtained in the manner indicated in Example 1. After recrystallization from dilute alcohol it decomposes at 101° C.

4. 64 grams of 3.4-dibenzyloxy-propiophenone in 500 cc. of benzene are slowly mixed with 18.7 grams of butyl nitrite while introducing hydrochloric acid gas. After the liquid has been allowed to stand for several hours at room temperature, the excess of benzene is distilled off in a vacuum. The crystalline residue is washed with hexahydrobenzene and recrystallized from dilute alcohol. The 3.4-di-benzyloxy-isonitrosopropiophenone melts at 117° C.

35 grams of the isonitroso compound obtained are dissolved in 250 cc. of alcohol and catalytically hydrogenated with nickel and hydrogen. The catalyst is then separated by filtration by suction and the filtrate is evaporated in a vacuum. The residue is taken up with dry ether and, by introducing hydrochloric acid gas, the 3.4-dibenzyloxy-phenylpropanolamine - hydrochloride is precipitated. The hydrochloride is dissolved, without further purification, in 6–7 times the quantity of absolute alcohol and the reduction is completed with hydrogen in the presence of palladium. As soon as the calculated quantity of hydrogen has been absorbed, the catalyst is separated by filtering by suction and the alcoholic solution is completely evaporated to dryness in a vacuum. The 3.4-dihydroxyphenylpropanolamine-hydrochloride is obtained by recrystallization of the residue from methanol and addition of acetone. The anhydrous compound melts at 178° C.

The 3.4-di-benzyloxy-propiophenone used as parent material is obtained by introducing 166 grams of propiopyrocatechin and 350 grams of benzyl bromide into 1000 cc. of an alcoholic caustic potash solution of 12 per cent. strength and heating the whole for about 2 hours on the water bath. The reaction mixture is mixed, while still hot, with water which dissolves the potassium bromide formed during the reaction. On cooling, the dibenzyl compound crystallizes after recrystallization from hexahydrobenzene, it melts at 60° C.

5. 76 grams of para-benzyloxy-butyrophenone (obtained from para-hydroxybutyrophenone by reaction with benzyl bromide) are dissolved in 450 cc. of benzene and 30 grams of butyl nitrite are added while stirring and introducing hydrochloric acid gas. After standing for several hours, the excess of benzene is removed in a vacuum, the residue is stirred with hexahydrobenzene and the crystalline magma formed is filtered by suction. By recrystallizing from alcohol of 70% strength the para-benzyloxy-isonitrosobutyrophenone is obtained melting at 123° C.–124° C. The product is further converted, in the manner indicated in the preceding examples into the para-hydroxyphenylaminobutanol-hydrochloride which melts at 211° C. with decomposition.

6. 120 grams of meta-benzyloxy-propiophenone are dissolved in 1 liter of ether and mixed with 45 grams of propyl nitrite in the course of ½ hour while introducing hydrochloric acid gas and stirring. The product is worked up as indicated in Example 1. The meta-benzyloxy-isonitrosopropiophenone obtained melts, after recrystallization from decahydronaphthalene, at 85° C.; on reduction, it yields the amino alcohol described in Example 2.

7. 23.9 grams of meta-benzyloxy-propiophenone are dissolved in 250 cc. of ether, mixed with 6.8 grams of finely powdered sodium nitrite and gaseous hydrochloric acid is introduced for ½ hour, while stirring. After the whole has been boiled for several hours, the sodium chloride formed is separated by filtering by suction, the liquid is concentrated on the water bath and the residue is absorbed in dilute caustic soda solution. The meta-benzyloxy-isonitrosopropiophenone separates from the alkaline solution by additions of concentrated hydrochloric acid and, after recrystallization from decahydronaphthalene, melts at 85° C. The product is further worked up as indicated in Example 2.

8. 38.4 grams of para-acetoxy-propiophenone are dissolved in 300 cc. of ether and, after addition of 26 grams of ethereal hydrochloric acid of 30% strength, 20.6 grams of butyl nitrite are added thereto drop by drop. After heating for several hours on the water bath the introduction of the nitroso group is complete. The ethereal solution is then repeatedly shaken with dilute caustic soda solution and the combined alkaline liquids are acidified with hydrochloric acid. The para-acetoxy-isonitrosopropiophenone which separates melts, after recrystallizing from alcohol, at 120° C.–121° C. For splitting off the acetyl group 10 grams of the isonitro compound obtained are boiled for a short time with hydrochloric acid of 20% strength and, after cooling, the para-hydroxyisonitrosopropiophenone melting at 178° C. is precipitated from the solution by means of hydrochloric acid.

10 grams of para-hydroxyisonitrosopropiophenone are dissolved in 150 cc. of alcohol containing 8 grams of hydrochloric acid and hydrogenated with palladium and hydrogen. After the calculated quantity of hydrogen has been absorbed, the catalyst is separated by filtering by suction and the filtrate is concentrated in a vacuum, whereby the para-hydroxyphenylpropanolamine-hydrochloride, melting at 207° C., crystallizes out.

The para-acetoxy-propiophenone used as parent material is obtained by dissolving 100 grams of parahydroxypropiophenone in 200 grams of acetic anhydride, boiling the whole for 2 hours in a reflux apparatus, removing the excess of acetic anhydride by distillation, and then distilling the residue in a vacuum. The para-acetoxy-propiophenone distils at 160° C.–162° C. under 8 mm pressure.

We claim:

1. The process which consists in causing nitrous acid to act upon a compound of the following general formula

R—CO—CH₂—Y wherein R stands for a phenyl nucleus substituted by at least one radical of the group consisting of benzyloxy and acetoxy, and Y for an alkyl group of the lower aliphatic series, and subjecting the isonitroso compound thus obtained to a reduction process.

2. The process which consists in causing nitrous acid to act upon a compound of the following general formula

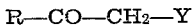

wherein at least one X stands for a radical of the group consisting of benzyloxy and acetoxy and at least one X stands for hydrogen, and Y stands for an alkyl group of the lower aliphatic series, and subjecting the isonitroso compound thus obtained to a reduction process.

3. The process which consists in causing nitrous acid to act upon a compound of the following general formula

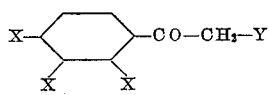

wherein two X's in ortho-position stand for a radical of the group consisting of benzyloxy and acetoxy and the remaining X stands for hydrogen and Y for an alkyl group of the lower aliphatic series, and subjecting the isonitroso compound thus obtained to a reduction process in the form of its salts or as free base by means of hydrogen in the presence of a catalyst.

4. The process which consists in causing an alkyl nitrite in the presence of an acid to act upon a compound of the following formula

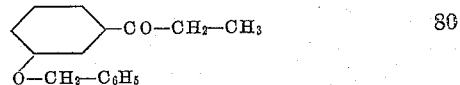

and reducing the isonitroso compound thus obtained in the form of its salts or as free base by means of hydrogen in the presence of a catalyst.

5. The process which consists in causing butyl nitrite in the presence of hydrochloric acid to act upon a compound of the following formula

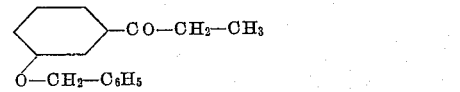

and reducing the isonitroso compound thus obtained in the form of its salts or as free base by means of hydrogen in the presence of a nickel catalyst and further treating the meta-benzyloxy-phenyl-2-aminopropanol-1 thus obtained with hydrogen in the presence of a palladium catalyst.

6. The process which consists in causing an alkyl nitrite in the presence of an acid to act upon a compound of the following formula

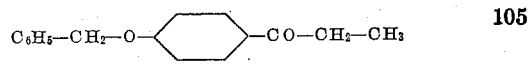

and reducing the isonitroso compound thus obtained in the form of its salts or as free base by means of hydrogen in the presence of a catalyst.

7. The process which consists in causing butyl nitrite in the presence of hydrochloric acid to act upon a compound of the following formula

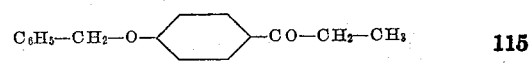

and reducing the isonitroso compound thus obtained in the form of its salts or as free base by means of hydrogen in the presence of a nickel catalyst and further treating the para-benzyloxy-phenyl-2-aminopropanol-1 thus obtained with hydrogen in the presence of a palladium catalyst.

8. The process which consists in causing an alkyl nitrite in the presence of an acid to act upon a compound of the following formula

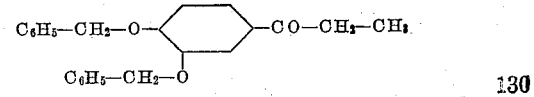

and reducing the isonitroso compound thus obtained in the form of its salts or as free base by means of hydrogen in the presence of a catalyst.

9. The process which consists in causing butyl nitrite in the presence of hydrochloric acid to act upon a compound of the following formula

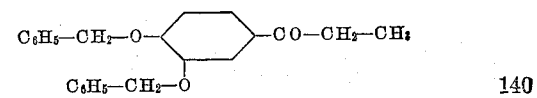

and reducing the isonitroso compound thus obtained in the form of its salts or as free base by means of hydrogen in the presence of a nickel catalyst and further treating the 3',4'-di-benzyloxy-phenyl(1')-2-aminopropanol-1 thus obtained with hydrogen in the presence of a palladium catalyst.

MAX BOCKMÜHL.
GUSTAV EHRHART.
LEONHARD STEIN.